US012296790B2

(12) United States Patent
Swensen

(10) Patent No.: US 12,296,790 B2
(45) Date of Patent: May 13, 2025

(54) OUTRIGGER PAD HOLDER

(71) Applicant: Assembly Systems, Inc., Minneapolis, MN (US)

(72) Inventor: Kyle Swensen, Pittsville, WI (US)

(73) Assignee: Interstate Assembly Systems, Inc., Minneapolis, MN (US)

( * ) Notice: Subject to any disclaimer, the term of this patent is extended or adjusted under 35 U.S.C. 154(b) by 274 days.

(21) Appl. No.: 17/751,604

(22) Filed: May 23, 2022

(65) Prior Publication Data
US 2022/0371523 A1 Nov. 24, 2022

Related U.S. Application Data

(60) Provisional application No. 63/224,711, filed on Jul. 22, 2021, provisional application No. 63/191,736, filed on May 21, 2021.

(51) Int. Cl.
B60R 9/00 (2006.01)
B60R 11/06 (2006.01)
B66C 23/78 (2006.01)
B60R 11/00 (2006.01)

(52) U.S. Cl.
CPC ............... *B60R 9/00* (2013.01); *B60R 11/06* (2013.01); *B66C 23/78* (2013.01); *B60R 2011/0052* (2013.01); *B60R 2011/0059* (2013.01)

(58) Field of Classification Search
CPC ... B60R 9/00; B60R 11/06; B60R 2011/0052; B60R 2011/0059; B66C 23/78
See application file for complete search history.

(56) References Cited

U.S. PATENT DOCUMENTS

| 5,878,940 A | * | 3/1999 | Rosenbalm | B23K 31/02 228/184 |
| 6,164,697 A | * | 12/2000 | Riggs | B60S 9/02 248/188.9 |
| 6,182,906 B1 | * | 2/2001 | Dupre | F25C 3/04 239/14.2 |

(Continued)

FOREIGN PATENT DOCUMENTS

| JP | H0144379 Y2 | * | 12/1989 | |
| JP | H1192093 A | * | 4/1999 | |
| JP | 2011168148 A | * | 9/2011 | ................ B60S 9/02 |

OTHER PUBLICATIONS

JP-H0144379-Y2 English Translation (Year: 1989).*
JP-2011168148-A English Translation (Year: 2011).*
JP-H1192093-A English Translation (Year: 1999).*

*Primary Examiner* — James A Shriver, II
*Assistant Examiner* — Michael T. Walsh
(74) *Attorney, Agent, or Firm* — Winthrop & Weinstine P.A.

(57) ABSTRACT

An outrigger pad holder is provided. The outrigger pad holder includes a pocket for receiving an outrigger pad and at least one connection point for attaching the outrigger pad holder to an outrigger. The outrigger pad is coupled to an outrigger, such as to an outrigger cylinder, such that the outrigger pad holder moves with the outrigger. Accordingly, when the outrigger is deployed, the outrigger pad holder is moved outwardly from the vehicle. When the outrigger is pulled in, for example overnight or during travel, the outrigger pad holder (and outrigger pad held therein) is pulled into the body of the vehicle.

20 Claims, 19 Drawing Sheets

(56) References Cited

U.S. PATENT DOCUMENTS

| | | | |
|---|---|---|---|
| 7,044,423 B2 * | 5/2006 | Bober | F16M 11/18 |
| | | | 248/188.4 |
| 7,338,077 B2 * | 3/2008 | Richard | B66C 23/62 |
| | | | 280/765.1 |
| 11,255,073 B2 * | 2/2022 | Negri | B66C 23/78 |
| 11,414,307 B2 * | 8/2022 | Griego | B60R 9/06 |

* cited by examiner

OUTRIGGER PAD HOLDER

FIELD OF THE INVENTION

The present disclosure relates to a novel and advantageous outrigger pad holder. Particularly, the present disclosure relates to a novel and advantageous outrigger pad holder that is coupled to an outrigger. More particularly, the present disclosure relates to a novel and advantageous outrigger pad holder that is coupled to an outrigger, improves safety for workers, and protects against theft.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Outriggers (sometimes called stabilizers) are arms (or legs) that extend from a truck, such as a crane, to keep the truck from tipping when using the crane. The arms typically are retractable hydraulic arms but can be any stabilizing structure. Hydraulic outriggers commonly come in two shapes: an H style and an A frame. The H style has a pair of square or round legs positioned at the end of an extendable horizontal beam such that the outrigger extends out and down. The A-frame extends at an angle (in contrast with extending out and down). Regardless of style, the outrigger keeps the truck stable during any kind of lift. More specifically, the outrigger extends outwardly and makes contact with the ground several feet from the truck, thereby distributing the load over a larger area and providing a solid, stable base. At the point that the outrigger contacts the ground, the outrigger typically has a ball and socket joint.

An outrigger pad is a safety tool or support element that can be used with the outrigger, or generally with any equipment that has an outrigger, down jack, or stabilizer. The outrigger pad is a structural element that is placed on the supporting surface (such as the ground) and that is used to distribute the outrigger load over a larger area. The outrigger pad receives the outrigger arm/leg/cylinder. More specifically, the outrigger pad may be configured to receive the ball from the outrigger ball and socket joint. The outrigger pad keeps the outrigger from pushing straight into the dirt or pavement and disperses the weight over a larger surface area. The size and thickness of the outrigger pad may be selected based on the type of equipment, the soil conditions at the work site, and the type of lift being performed.

Outrigger pad racks or holders may be provided for holding the outrigger pads when they are not being used. Typically such outrigger pad holders are simple frames arranged on the side of a truck. An operator needs to manually lift the outrigger pad from the rack and carry it to a desired placement location, which can lead to jobsite injuries. Outrigger pads are typically formed of aluminum and brass and are targeted for theft. As positioned in typical outrigger pad holders or racks, the pads are easily removed and stolen.

Thus, there is a need in the art for an improved outrigger pad holder.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to an outrigger pad holder for holding an outrigger pad, the outrigger pad holder comprising a pocket for receiving an outrigger pad and at least one attachment point at which the outrigger pad holder is attached to an outrigger.

The present disclosure, in one or more embodiments, additionally relates to an outrigger pad holder for holding an outrigger pad, the outrigger pad holder comprising a support plate, a right flange, a left flange, and a lower flange, wherein a pocket for receiving the outrigger pad is formed by the support plate, the right flange, the left flange, and the lower flange. The outrigger pad holder further comprises a plurality of attachment points. An extension for receiving a U-bracket such that the U-bracket and extension encircle an outrigger cylinder provides a first attachment point of the outrigger pad holder to the outrigger. An aperture on the support plate, wherein the aperture on the support plate is aligned with an aperture on the outrigger and a bolt is extended through the aperture on the support plate and the aperture on the outrigger provides a second attachment point of the outrigger pad holder to the outrigger.

The present disclosure, in one or more embodiments, relates to an outrigger pad holder for holding an outrigger pad, the outrigger pad holder comprising a support plate, a right flange, a left flange, and a lower flange, wherein a pocket for receiving the outrigger pad is formed by the support plate, the right flange, the left flange, and the lower flange. The outrigger pad holder further comprises a formed angle extension for receiving a U-bracket such that the U-bracket and formed angle extension encircle an outrigger cylinder and provide a first attachment point of the outrigger pad holder to the outrigger, wherein the formed angle extension includes tabs for insertion in slots of the support plate. The outrigger pad holder also includes a female connector on the support plate, wherein the aperture on the support plate is aligned with an aperture on the outrigger and a bolt is extended through the aperture on the support plate and the aperture on the outrigger to provide a second attachment point of the outrigger pad holder to the outrigger.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 2a is a back view of the curb side outrigger pad holder of FIG. 1a.

FIG. 3a is a perspective side view of a street side outrigger pad holder in accordance with the embodiment of FIG. 1a.

FIG. 4a is a back view of the street side outrigger pad holder of FIG. 3a.

DETAILED DESCRIPTION

Figure 1A:
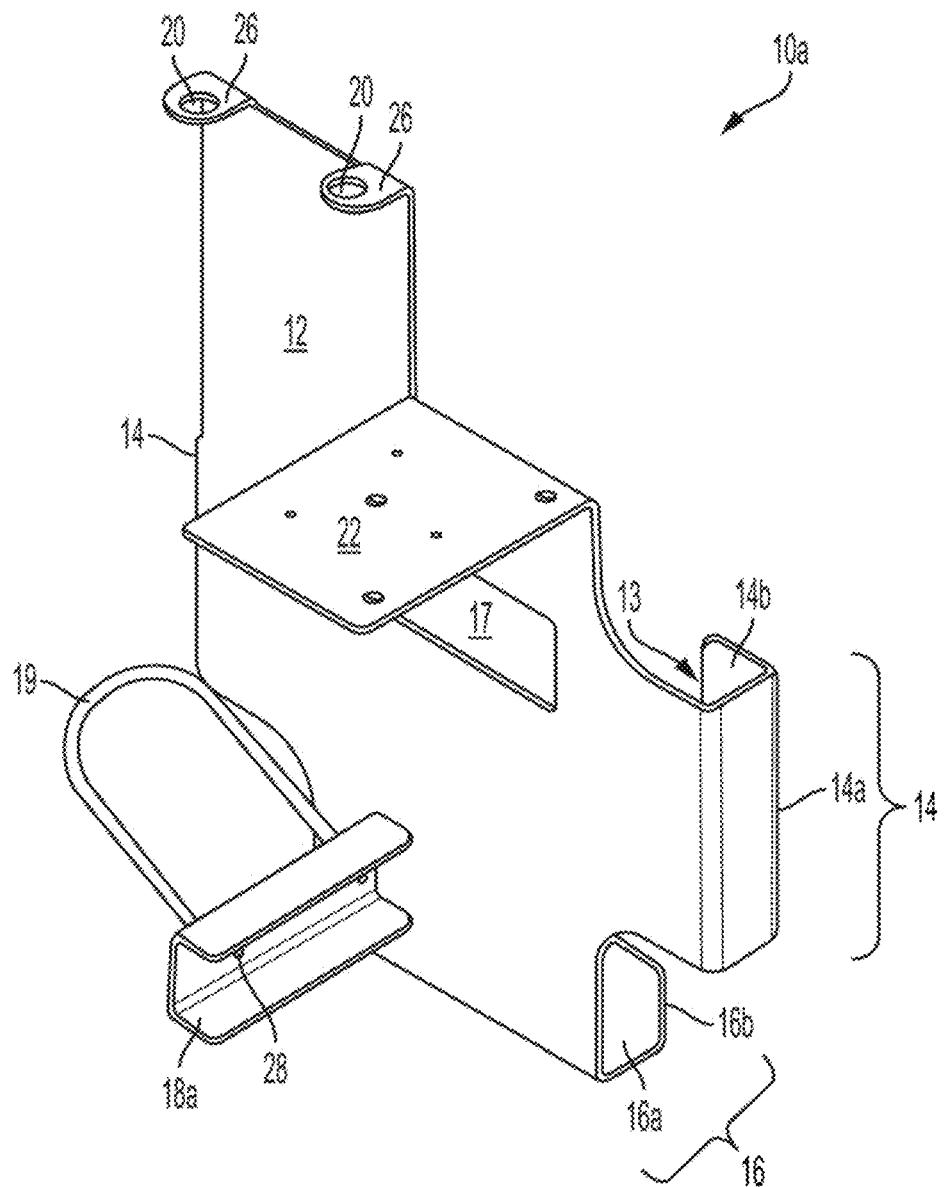
FIG. 1a is a perspective side view of a curb side outrigger pad holder, in accordance with a first embodiment.

The present disclosure relates to a novel and advantageous outrigger pad holder. Particularly, the present disclosure relates to a novel and advantageous outrigger pad holder that is coupled to an outrigger. More particularly, the present disclosure relates to a novel and advantageous outrigger pad holder that is coupled to an outrigger, improves safety for workers, and protects against theft.

An outrigger (or stabilizer) is an arm that extends from a vehicle to stabilize the vehicle, for example, when a crane is being deployed. The outrigger includes a linear extension and a connector or joint, such as a ball of a ball and socket joint, at the end of the linear extension. The linear extension, sometimes referred to as an outrigger cylinder, may comprise one or more pieces and the specific configuration is not important for use of the outrigger pad holder described herein. An outrigger pad is typically used with the outrigger to increase the surface area over which the pressure of the outrigger is distributed. The size, thickness, shape, and material of the outrigger pad may be selected to accommodate different vehicles, pieces of equipment, soil conditions at the work site, type of lift being performed, etc.

When an outrigger is deployed, an outrigger pad is attached to the outrigger at the end of the linear extension. For example, the outrigger pad may be attached to the outrigger at the ball of the ball and socket joint. Commonly, the outrigger pad is not fixedly attached to the outrigger. Rather, it is stored and only attached to the outrigger when the outrigger is to be used. An outrigger pad securement device, also referred to as an outrigger pad holder, is thus provided for holding and storing the pad when not in use.

In accordance with the teachings herein, an outrigger pad holder is provided that is coupled to an outrigger on a vehicle such that the outrigger pad moves with the outrigger. Accordingly, when the outrigger is deployed, the outrigger pad holder (and outrigger pad held therein) is moved outwardly from the vehicle. When the outrigger is pulled in (overnight or during travel), the outrigger pad holder (and outrigger pad held therein) is pulled into the body of the vehicle. An outrigger pad holder configured for bolting to the outrigger and including a pocket for receiving the outrigger pad is thus provided. It is to be appreciated that the outrigger pad holder may be used with any type of vehicle that uses an outrigger including a truck, crane, or other.

In accordance with the disclosure herein, an outrigger pad holder is provided that is fixed to the outrigger itself. In some embodiments, when the outrigger is not in an extended configuration (such as when pulled into the truck overnight or during travel), the pad holder is pulled into the body of the truck and the outrigger pad holder and its contents are not accessible.

The outrigger pad holder may be configured such that it is aligned with a portion of the linear extension of the outrigger that extends downwardly to the ground. The linear extension may be, for example, approximately 10 inches in height and can go 4-6 feet in extension down.

In accordance with one embodiment, two outrigger pad holders may be provided for use on a piece of equipment such as a truck—one for the curb side of the truck and one for the street side of the truck. In some embodiments, the curb side outrigger pad holder and the street side outrigger pad holder may be mirrors of one another. In the figures below, alternate illustration of a curb side versus a street side outrigger pad holder is intended only to show different orientations.

Figure 2A:
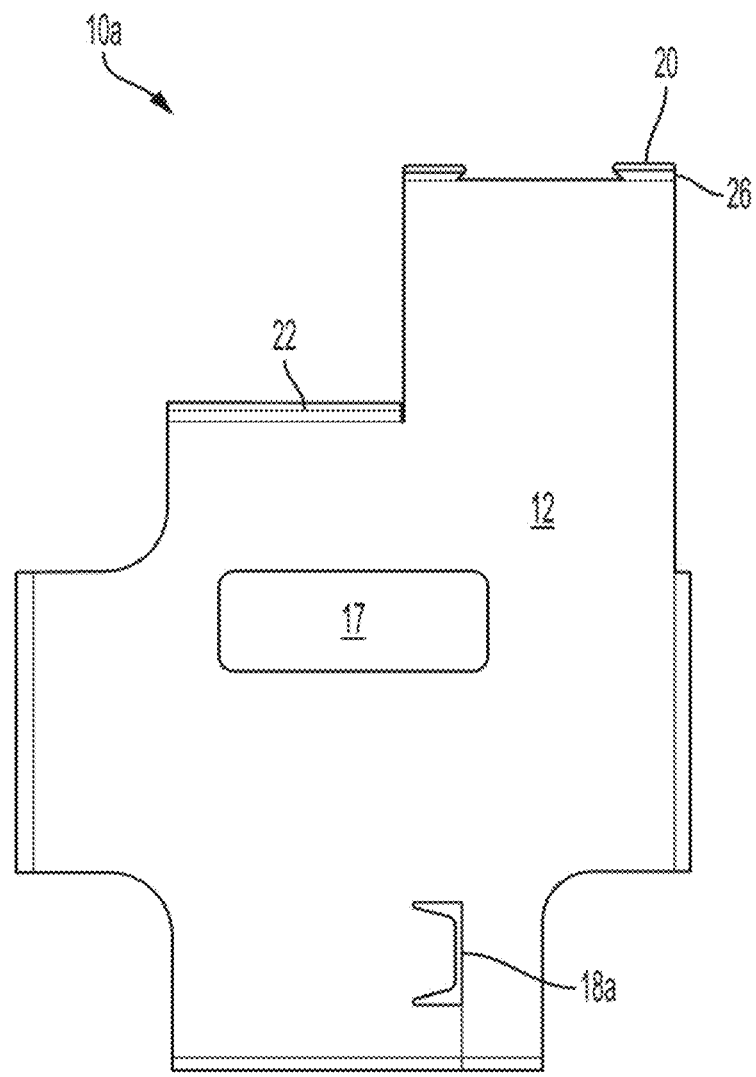
Figure 3A:
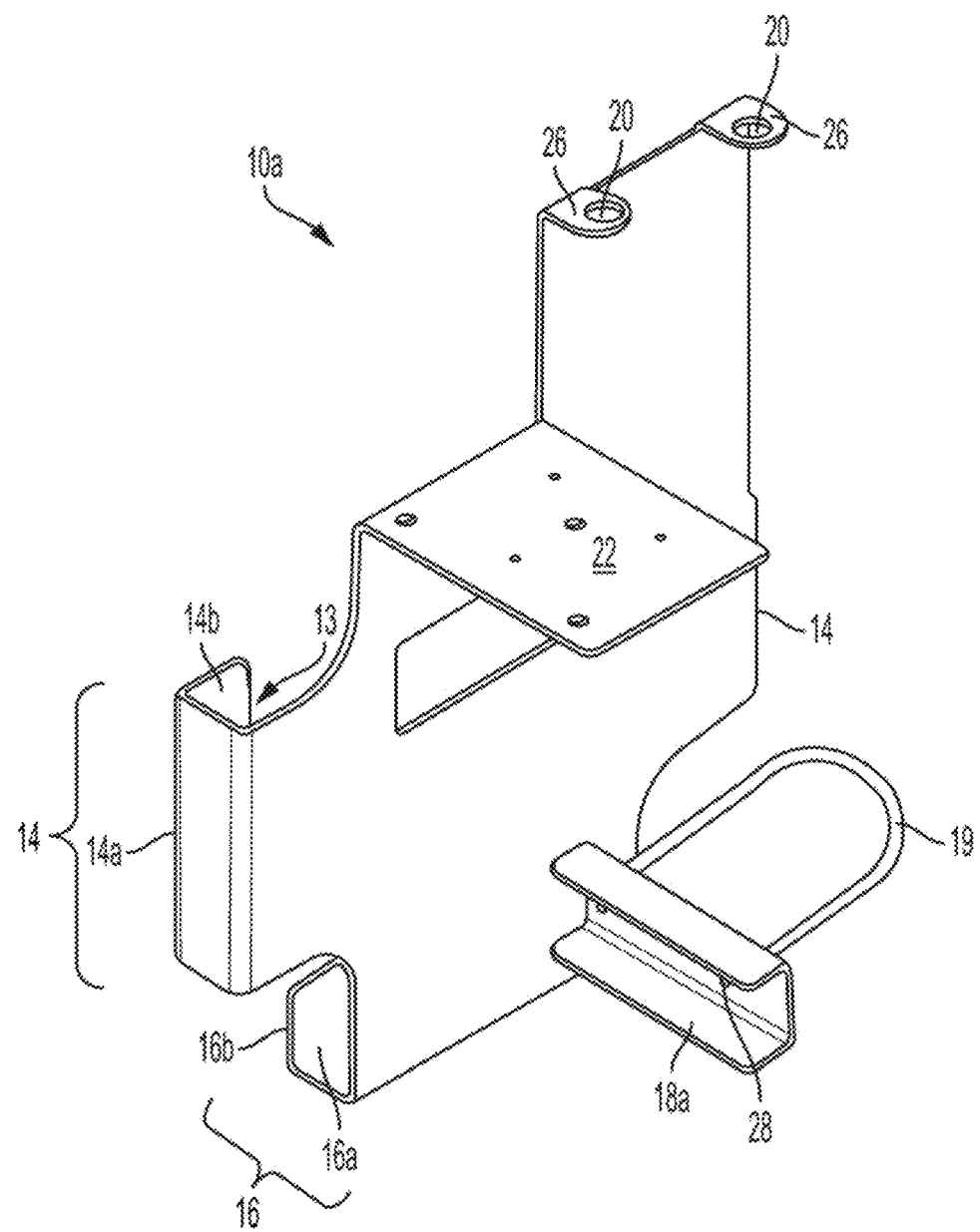
Figure 4A:
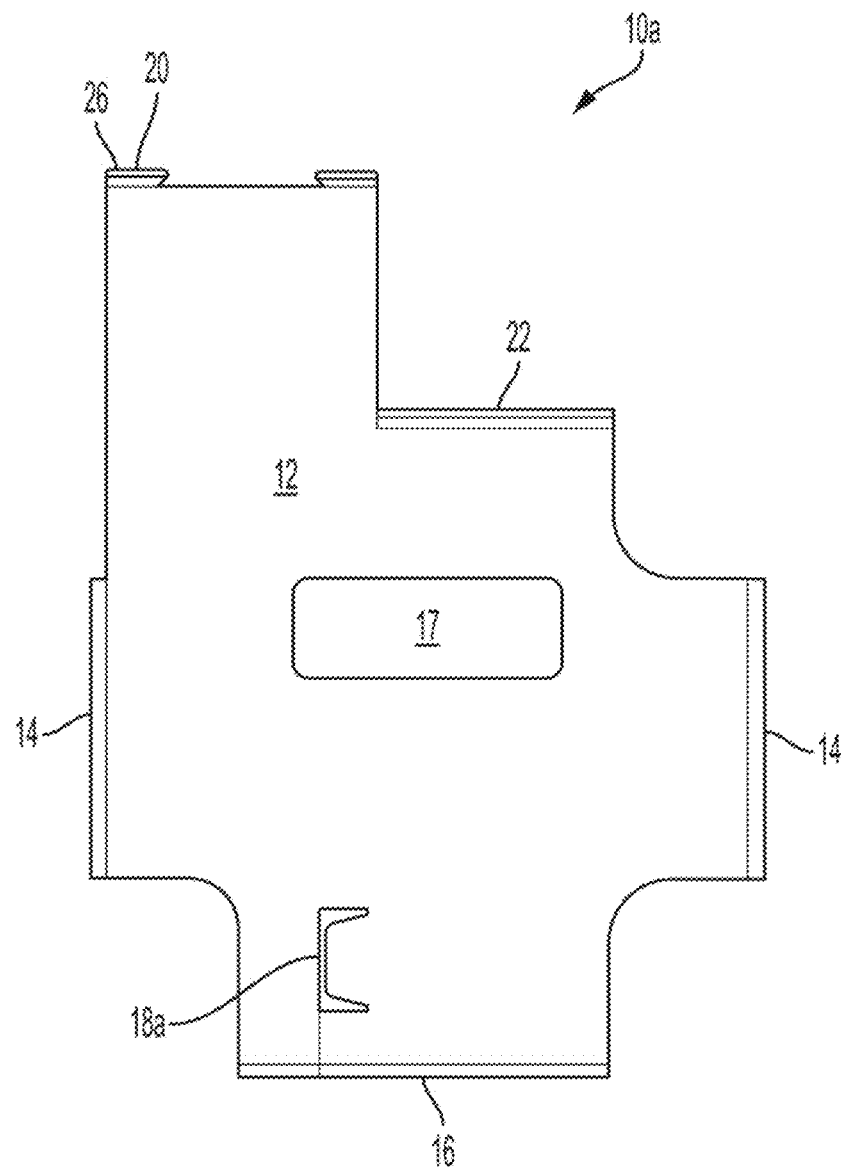

FIG. 1a illustrates a perspective view of a curb side outrigger pad holder 10a, in accordance with a first embodiment. FIG. 3a illustrates a perspective view of an street side outrigger pad holder, in accordance with one embodiment, and is a mirror of FIG. 1a. FIGS. 2a and 4a illustrate back views of the outrigger pad holders of FIGS. 1a and 3a, respectively.

Figure 1B:
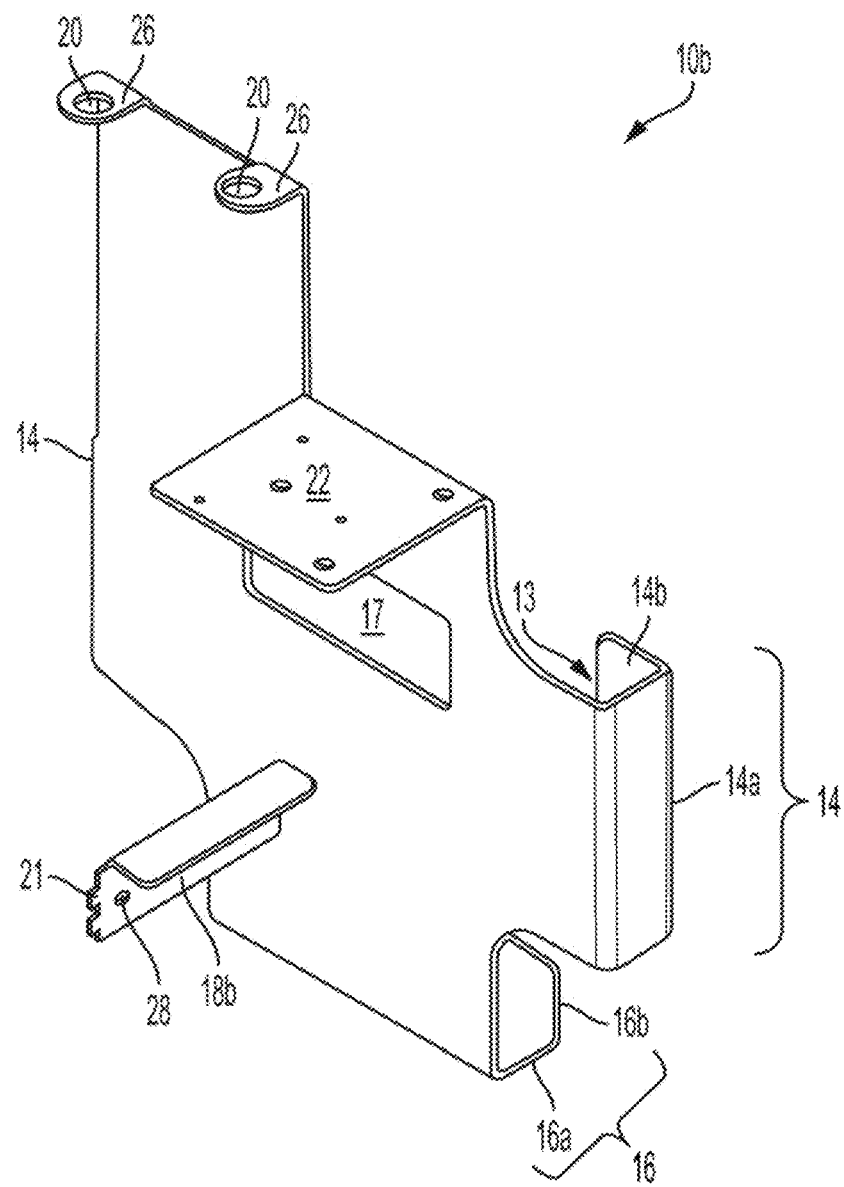
FIG. 1b is a perspective side view of a curb side outrigger pad holder, in accordance with a second embodiment.
Figure 2B:
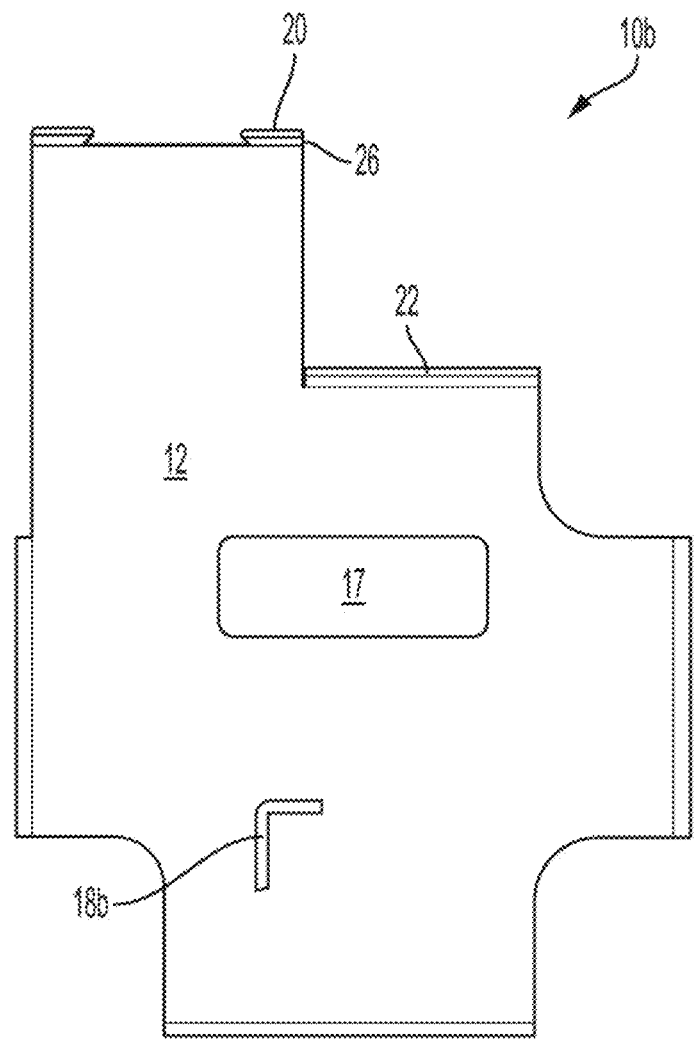
FIG. 2b is a back view of the curb side outrigger pad holder of FIG. 1B.
Figure 3B:
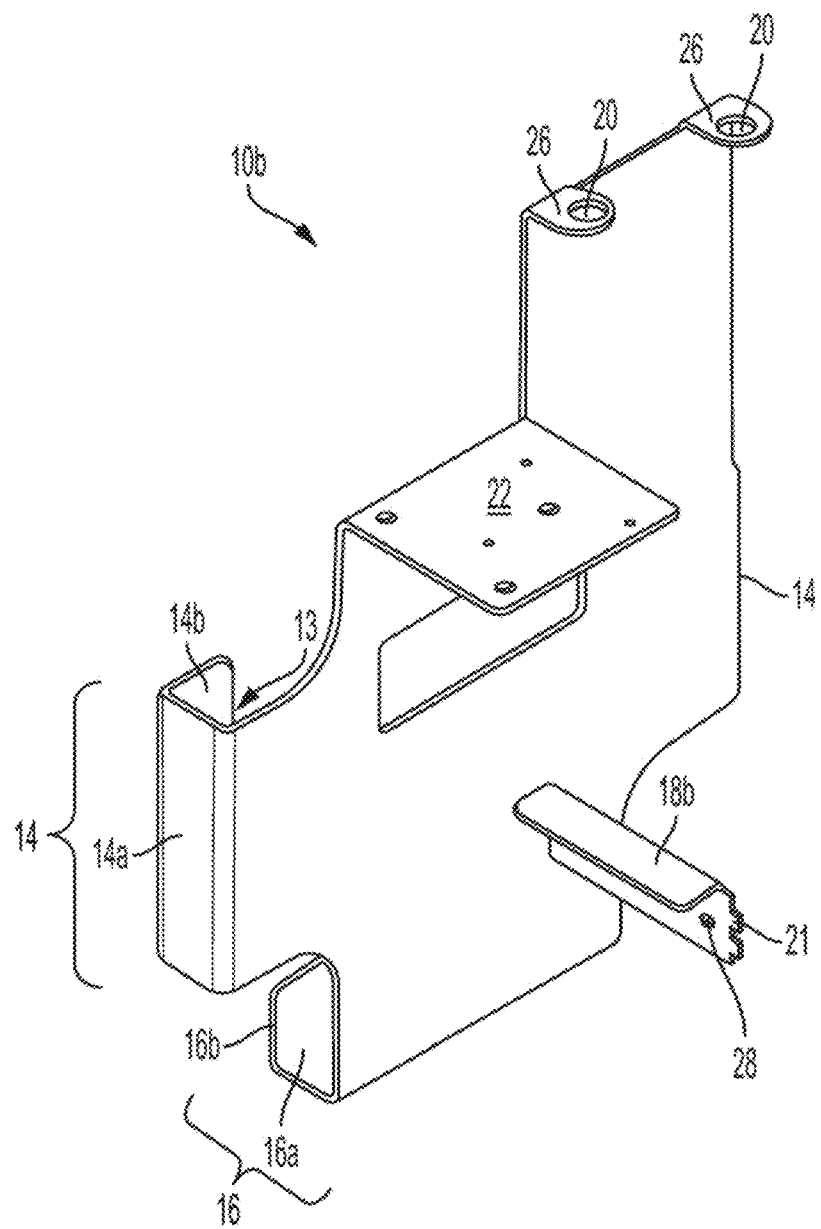
FIG. 3b is a perspective side view of a street side outrigger pad holder in accordance with the embodiment of FIG. 1B.
Figure 4B:
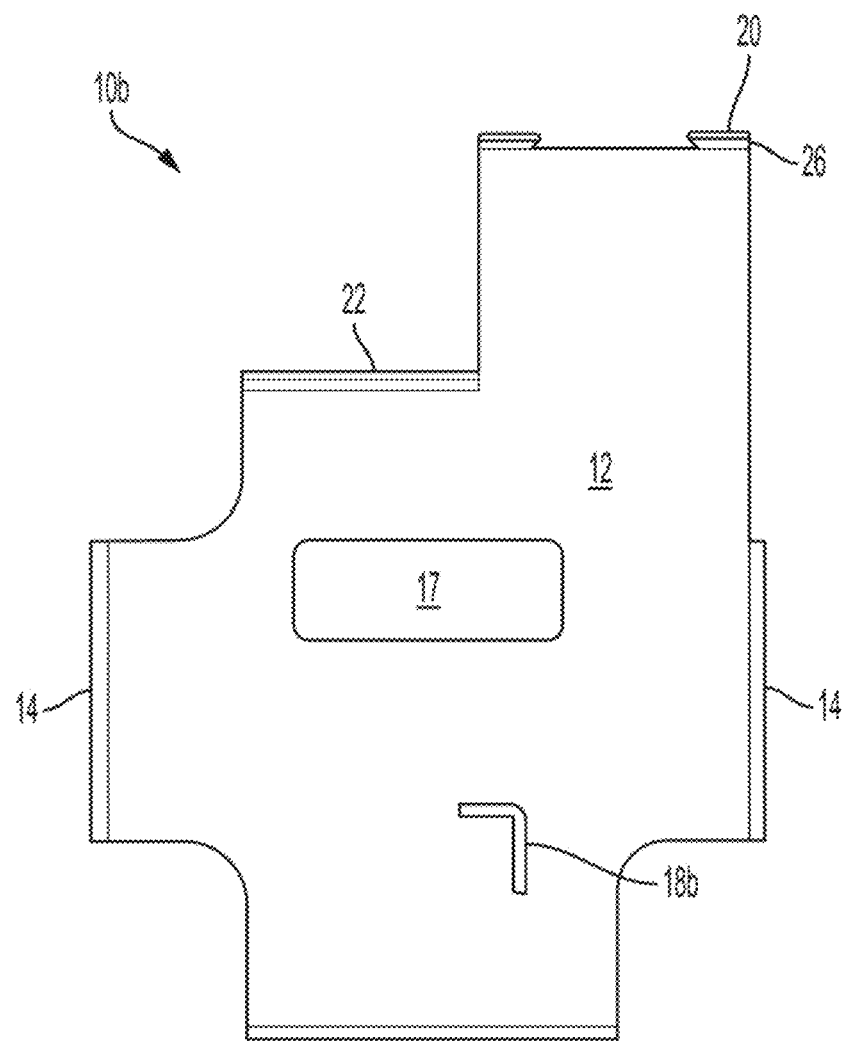
FIG. 4b is a back view of the street side outrigger pad holder of FIG. 3b.

FIG. 1b illustrates a perspective view of a curb side outrigger pad holder 10b, in accordance with a second embodiment. FIG. 3b illustrates a perspective view of a street side outrigger pad holder, in accordance with one embodiment, and is a mirror of FIG. 1b. FIGS. 2b and 4b illustrate back views of the outrigger pad holders of FIGS. 1b and 3b, respectively.

Figure 8:
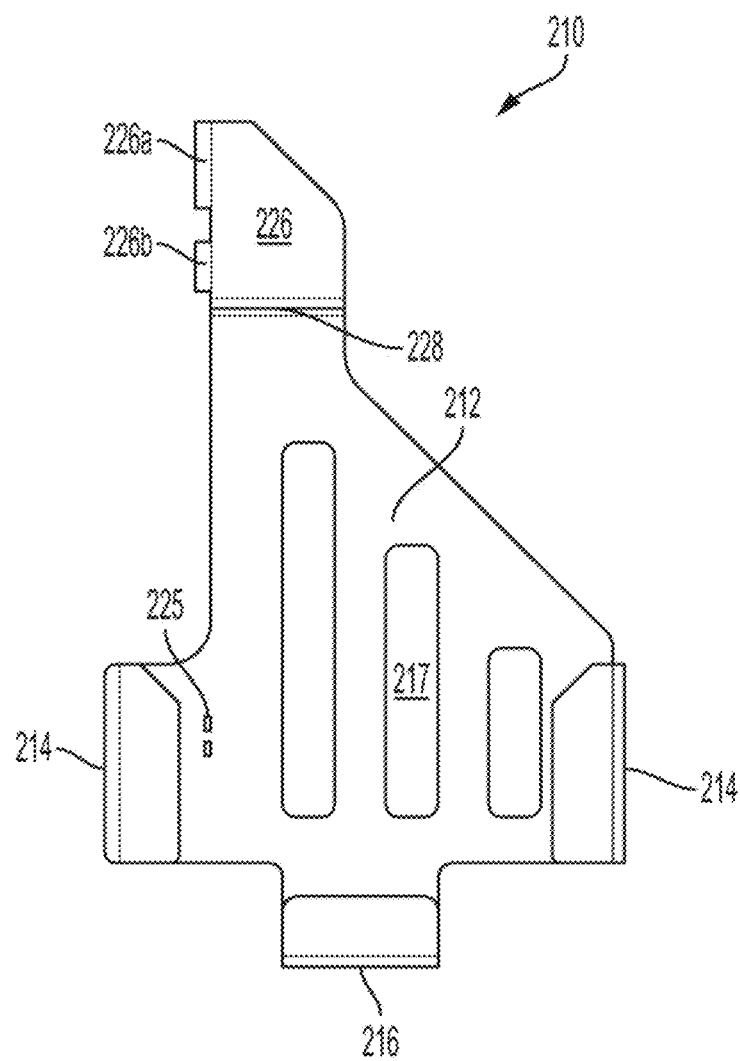
FIG. 8 is a front view of an outrigger pad holder in accordance with a third embodiment.

The outrigger pad holder 10a/10b comprises a support plate 12. A receiving pocket 13 is formed by edges 14 and bottom 16, with the support plate 12 forming the back of the pocket 13. The edges 14 may be referred to as left and right flanges and the bottom 16 may be referred to as a lower flange. The edges 14 and 16 may have rounded right angles or may have other shapes (such as shown in FIG. 8). In the embodiment of FIGS. 1a and 1b, the edges 14 and bottom 16 are integrally formed with the plate 12 without requiring welding, for example by folding extending portions of the plate 12. While separate edges 14 and bottom 16 are shown, in alternative embodiments, a continuous edging may be provided around a portion of the periphery of the pocket 13.

Figure 6:
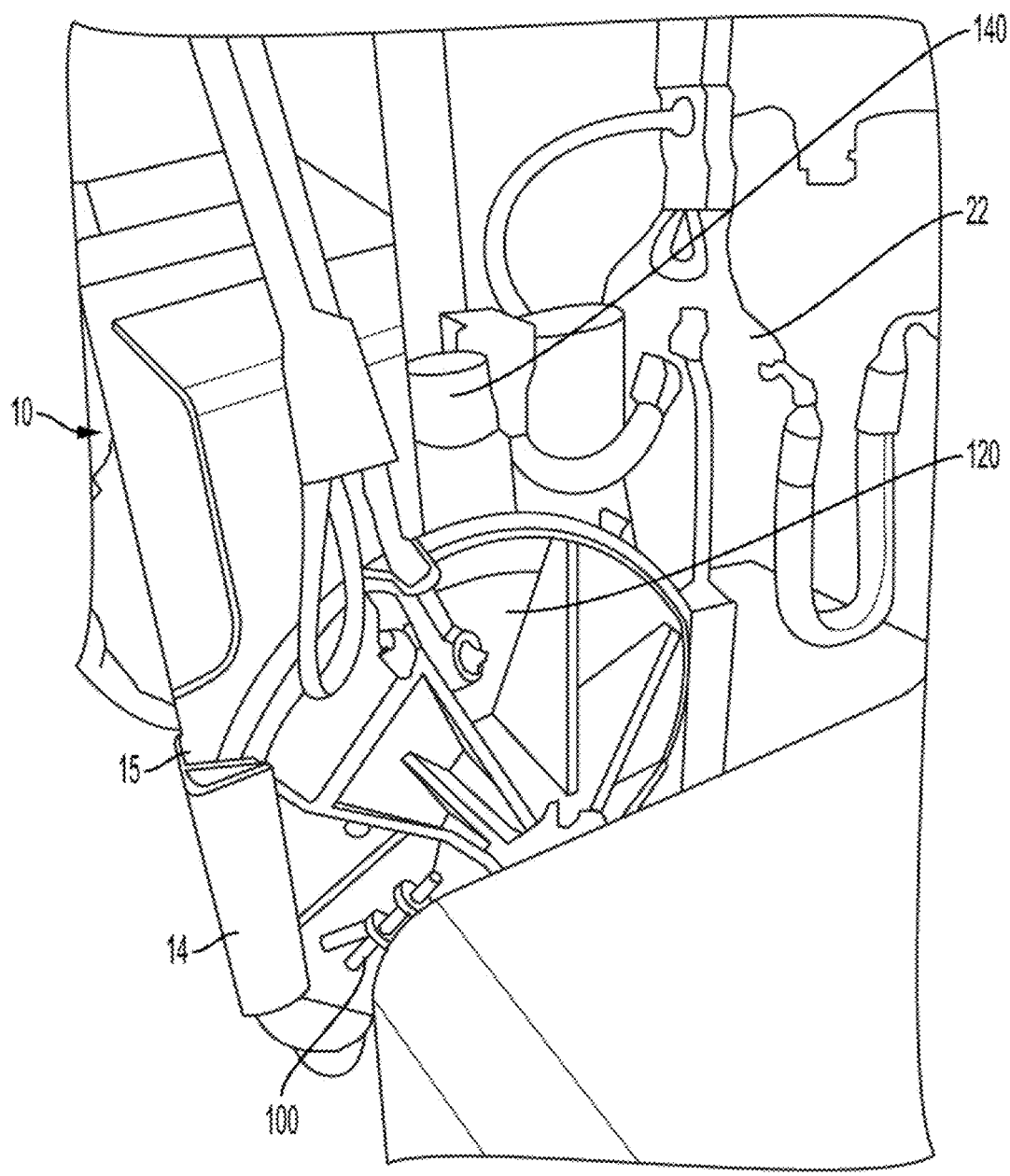
FIG. 6 a perspective view of an outrigger pad situated in a mounted outrigger pad holder, in accordance with one embodiment.

The edges comprise a first side 14a and a second side 14b. Similarly, the bottom comprises a first side 16a and a second side 16b. The relative size of the sides may be modified to adjust the size of the pocket 13 to accommodate differently sized outrigger pads. Outrigger pads generally have non-planar upper faces such that extending side 14b, a front side, may cause it to connect with a different portion of the upper face of the outrigger pad to give a more snug fit. Alternatively, as shown in FIG. 6, the edges 14 and/or bottom 16 may be adjusted, for example using wedges or triangles 15, such that the pocket 13 can accommodate differently sized outrigger pads.

While in the embodiment shown, the sides 14a and 14b forming edges 14 and sides 16a and 16b forming bottom 16 comprise integral extensions of the support plate, in other embodiments, the edges may each comprise one or more separate pieces that are welded or otherwise attached to the plate.

The support plate 12 includes a cut out 17 to reduce the weight of the outrigger pad holder. In the embodiment of FIGS. 1a and 1b, the cut out 17 is a single horizontal cut out. In other embodiments, such as shown in FIG. 8, one or more vertical cut outs may be used. In some embodiments, a mix of horizontal and vertical cut outs could be used. In general, it may be desirable for the cut outs to have a size and shape that reduces the likelihood of the outrigger pad catching the cut out when being put into or taken out of the outrigger pad holder.

Figure 5:
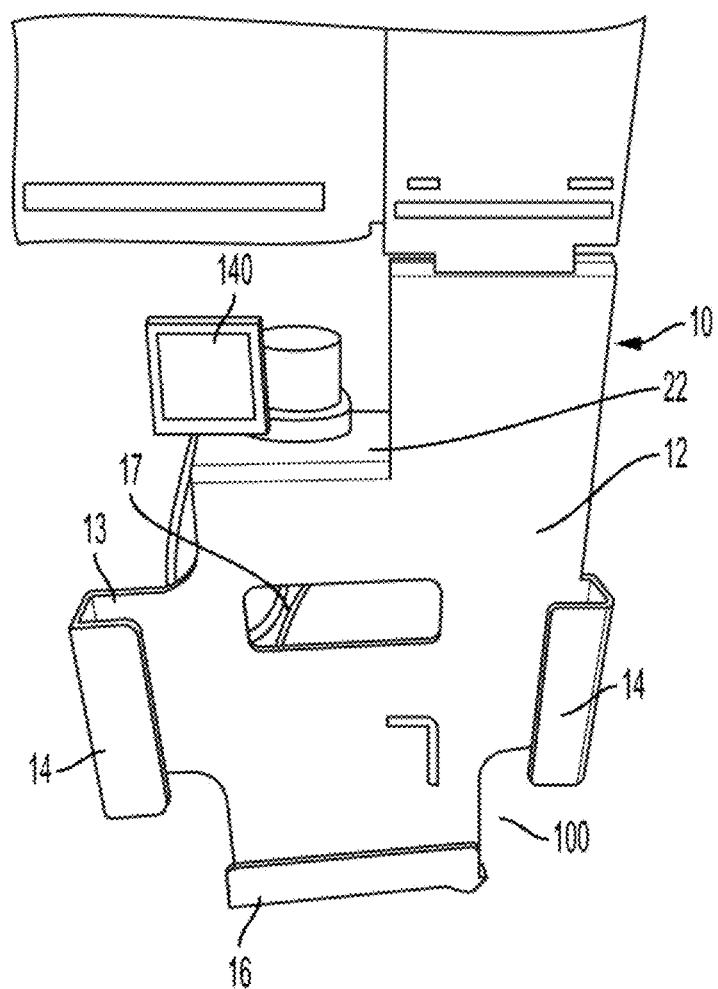
FIG. 5 is a front view of a mounted outrigger pad holder, in accordance with one embodiment.

A support flange 22, also referred to as a work light flange, may be provided for mounting work lights, a strobe light, or similar. FIGS. 5 and 6 illustrate a work light and a strobe light 140 situated on the support flange 22. Similarly, other supports, connections, or pockets for various accessories may be provided. The size of the support flange 22 may be chosen based on what is to be supported and to reduce the likelihood of interference between the support and something mounted on the vehicle.

The outrigger pad holder 10a/10b is attached to the outrigger. In the embodiment shown in FIGS. 1a and 1b, there is a 3 point connection between the outrigger pad holder 10a/10b and the outrigger. In some outriggers, multiple pieces of the outrigger are held together using male connectors, such as bolts, extending through female connectors of the outrigger. To install the outrigger pad holder 10a/10b, the outrigger male connector of the outrigger may be swapped out with a longer connector and the outrigger pad holder put between two typically adjacent outrigger parts. Accordingly, two male connectors, such as bolts, are extended through openings 20 and into reciprocal female connectors of the outrigger. The openings 20 may be provided in tabs 26. For the third connection point, an extension 18a/18b is provided supporting a U-bracket 19 that extends around the outrigger. The U-bracket may be extended through openings 28 in the extension 18a/18b. In this embodiment, the outrigger pad holder attaches to a faceplate of the outrigger wherein the faceplate is horizontal and the bolts are vertical.

The shape of the extension 18a/18b may vary based on manufacturability and/or use. In the embodiment of FIG. 1a, the extension 18a is a C-channel. In the embodiment of FIG. 1b, the extension 18b is L-shaped or a formed angle. The C-channel extension 18a is shown welded to the support plate 12. In contrast, the formed angle extension 18b includes tabs 21 for receipt by slots in the support plate 12. A formed angle extension 18b having tabs 21 on both ends thereof may be used interchangeably on a street side or a curb side outrigger pad holder. Alternatively, tabs 21 may be provided only on the end of the formed angle extension 18b that is inserted into the slots of the support plate 12. Using the formed angle extension 18b with tabs and slots, the placement of the extension 18b on the support plate 12 may be precisely controlled.

It is to be appreciated that more or fewer points of connection may be used and the specifics of the connection are less important than the fact that the outrigger pad holder is coupled directly to the outrigger. By coupling the outrigger pad holder to the outrigger itself, the placement of the pad holder follows the position of the outrigger. Thus, for example, when the outrigger is extended, the outrigger pad holder is also extended. The outrigger pad may then be removed from the outrigger pad holder approximately at the location where it is to be used. Conversely, when the outrigger is retracted into the truck, the outrigger pad holder is similarly retracted into the truck. The outrigger cannot be extended from the truck or the outrigger pad removed from the outrigger pad holder unless the truck is being operated.

FIG. 5 illustrates an outrigger pad holder 10 attached to an outrigger in accordance with one embodiment. The outrigger cylinder 100 can be seen behind the outrigger pad holder 10. As shown, the outrigger pad holder has a pocket 13 formed by the outrigger pad holder plate 12, sides 14, and bottom. FIG. 5 further illustrates a work light and strobe light 140 positioned on the support flange 22.

FIG. 6 illustrates an outrigger pad situated in an outrigger pad holder 10 attached to an outrigger, in accordance with one embodiment. As shown in FIG. 6, triangles or wedges 15 may be used to tighten the spacing of the pocket 13 to accommodate different sizes of outrigger pads 15.

Figure 7:
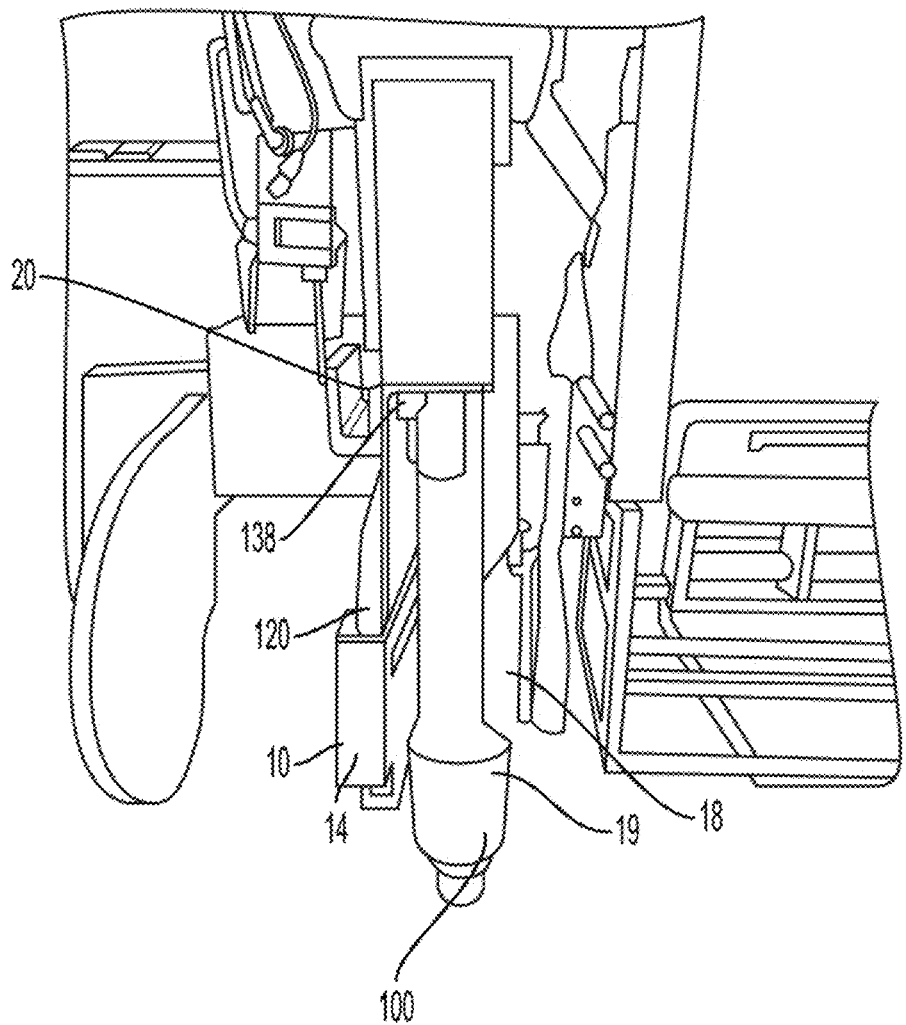
FIG. 7 is a side view of a mounted outrigger pad holder in accordance with one embodiment.

FIG. 7 illustrates a side view of an outrigger pad holder 10 attached to an outrigger cylinder 100 and holding an outrigger pad 120, in accordance with one embodiment. FIG. 7 provides a view of the u-bracket 19 attached extension 18 of the outrigger pad holder 10 and secured around the outrigger cylinder 100. FIG. 7 further illustrates bolts 130 extending through holes 20 and into the outrigger.

To remove an outrigger pad from the outrigger pad holder 10, the outrigger pad is lifted vertically out of the pocket 13. As shown in FIG. 7, the outrigger pad holder 10 may be coupled to the outrigger in a manner such that, when the outrigger and outrigger pad holder are retracted to the truck, a portion of the truck and/or the outrigger may overlay the outrigger such that it cannot be moved sufficiently vertically to allow it to be removed from the pocket 13 of the outrigger pad holder 10. In the embodiment of FIG. 7, a portion of the truck blocks removal of the outrigger pad from the outrigger pad holder when the outrigger and outrigger pad holder are in the retracted position, thereby protecting against theft of the outrigger pad.

The outrigger pad holder is generally low profile. It can be configured for a carrying capacity of up to 500 pounds, of up to 800 pounds, or of up to 1000 pounds. It may be provided to hold outrigger pads of up to 48 inch diameter, up to 60 inch diameter, or any other suitable size. In general, the outrigger pad holder does not extend downwardly past the bottom of the outrigger cylinder.

In general, an outrigger pad securement device, or outrigger pad holder, may be provided for use with any vehicle. The outrigger pad holder will have a pocket for holding the outrigger pad and will be fixed to the outrigger, such as at the outrigger cylinder. In most embodiments, the pocket is formed by a support plate, two side pieces (left and right flanges), and a bottom piece (lower flange). The side pieces and bottom pieces may optionally be integral with the support plate.

The manner by which the outrigger pad holder is fixed to the outrigger, or the attachment point, may be varied based on the outrigger and the vehicle using the outrigger. For example, in the embodiments described with respect to FIGS. 1a and 1b, the outrigger pad holder attaches to a faceplate of an outrigger wherein the faceplate is horizontal and the bolts are vertical. In the embodiment described below with respect to FIG. 8, the outrigger pad holder attaches to a faceplate of an outrigger wherein the faceplate is vertical and the bolts are horizontal.

Figure 9:
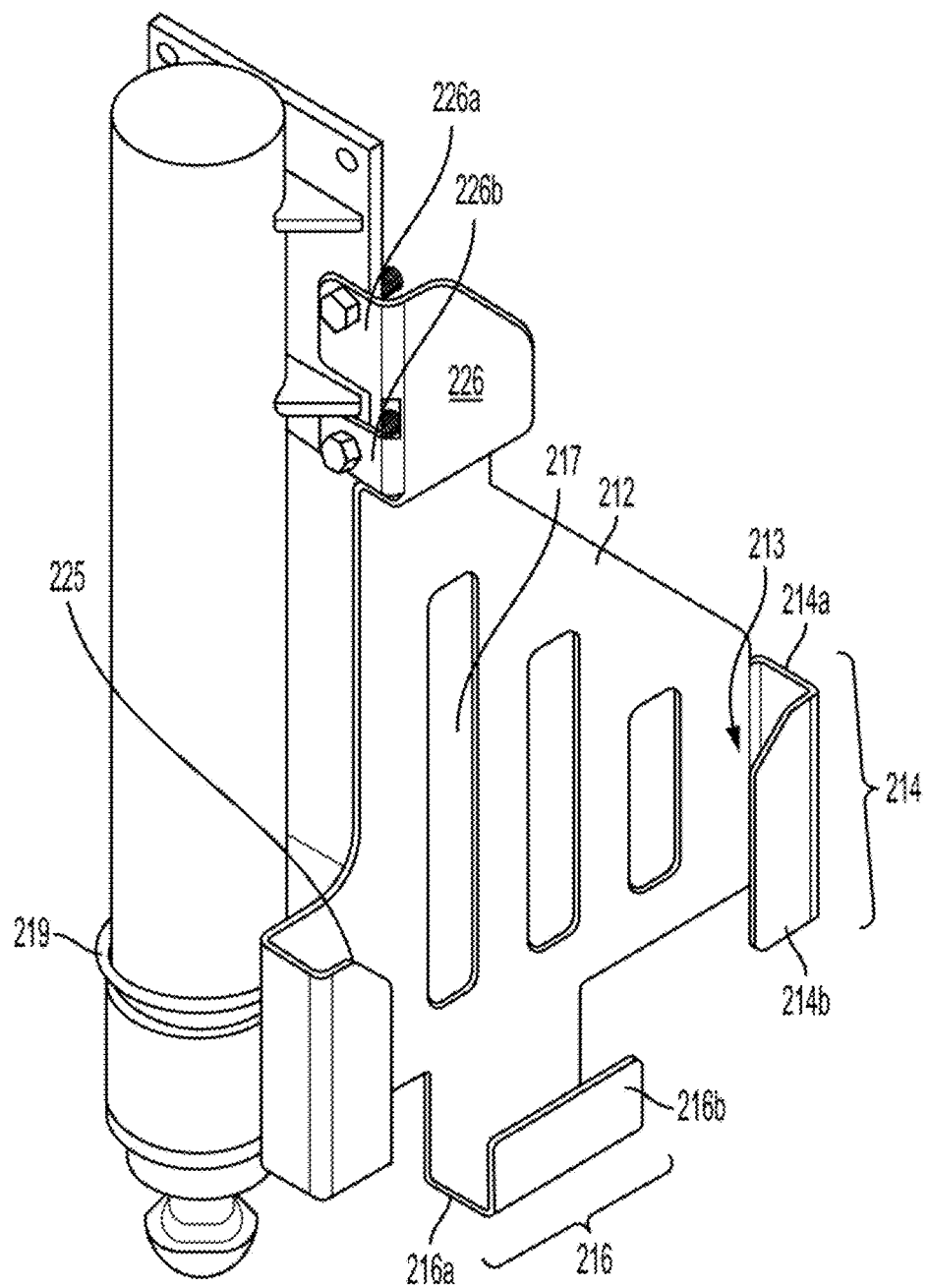
FIG. 9 is a perspective view of the outrigger pad holder of FIG. 8 as mounted on an outrigger.
Figure 10:
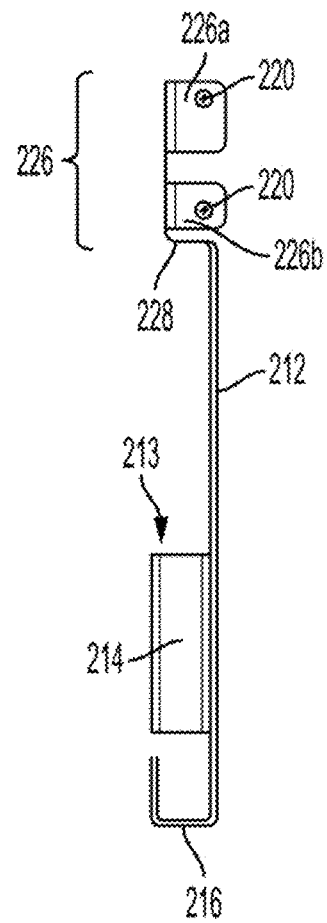
FIG. 10 is a side view of the outrigger pad holder of FIG. 8.
Figure 11:
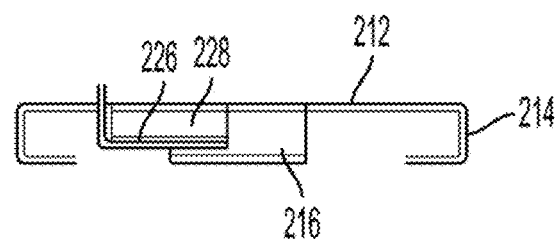
FIG. 11 is a top view of the outrigger pad holder of FIG. 8.
Figure 12:
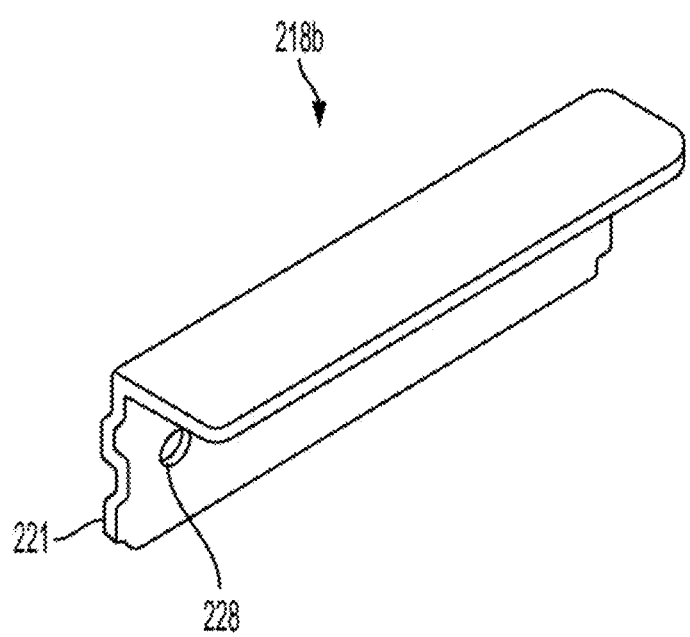
FIG. 12 is a perspective view of a formed angle extension, in accordance with one embodiment.
Figure 13:
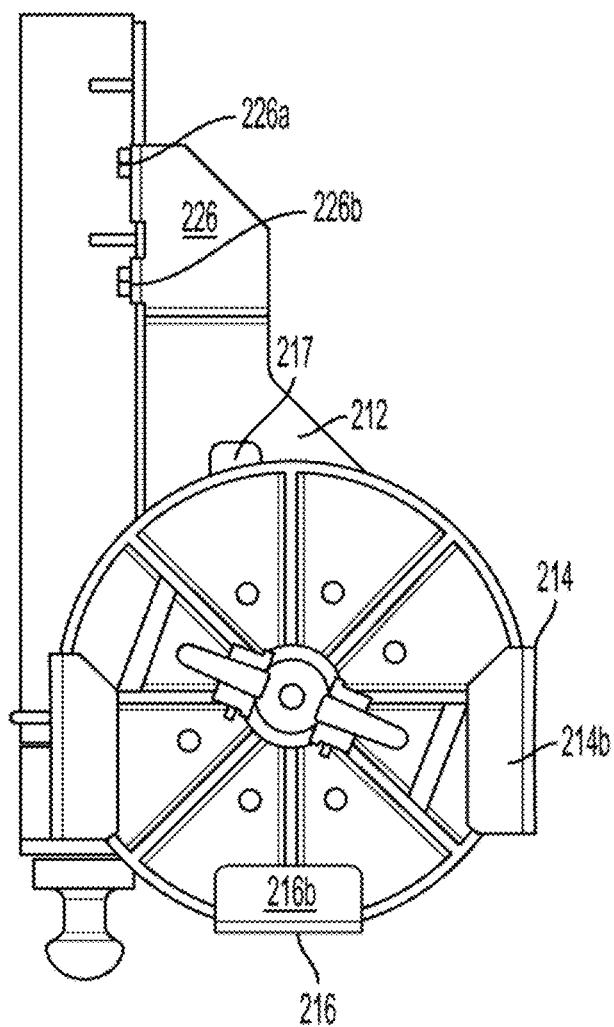
FIG. 13 is a front view of an outrigger pad holder of FIG. 8 mounted on an outrigger with an outrigger pad situated therein.
Figure 14:
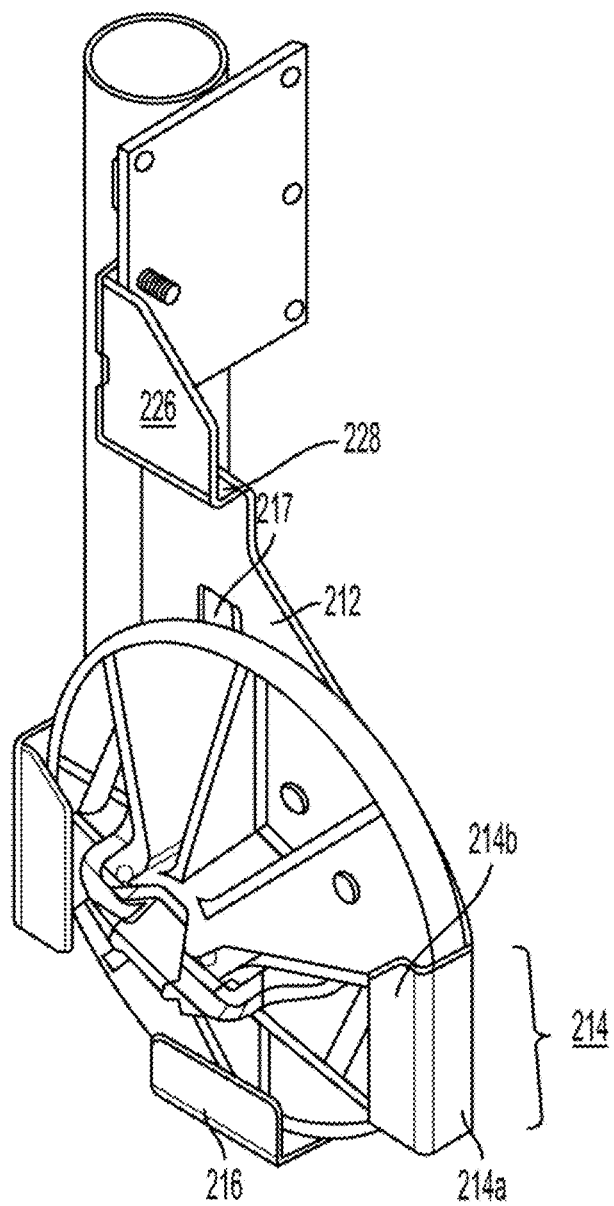
FIG. 14 is a front view of an outrigger pad holder of FIG. 8 mounted on an outrigger with an outrigger pad situated therein.
Figure 15:
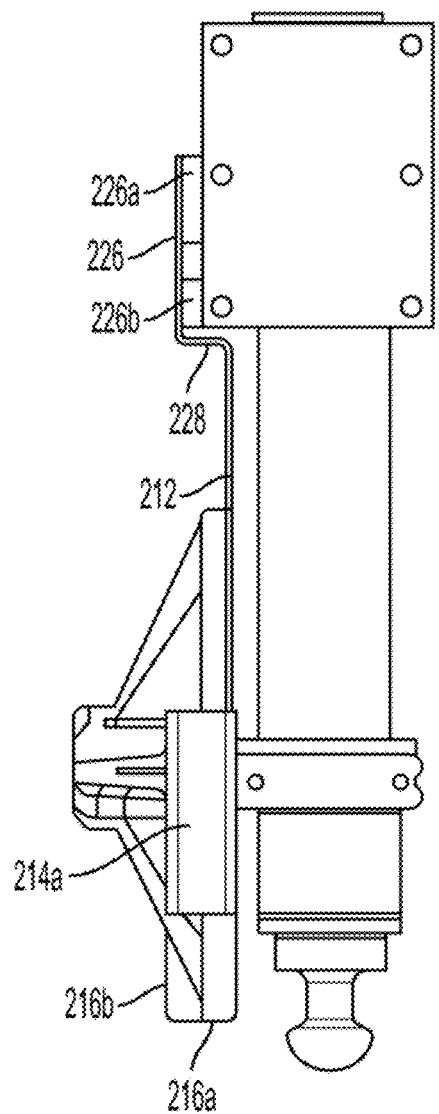
FIG. 15 is a side view of an outrigger pad holder of FIG. 8 mounted on an outrigger with an outrigger pad situated therein.
Figure 16:
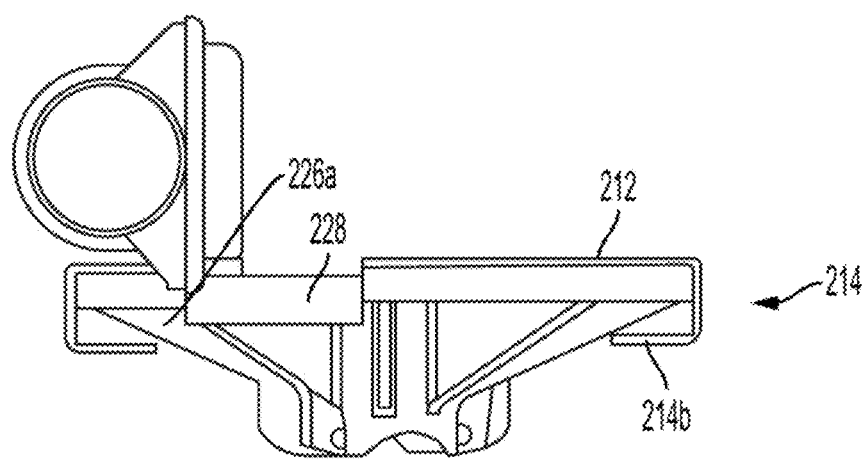
FIG. 16 is a top view of an outrigger pad holder of FIG. 8 mounted on an outrigger with an outrigger pad situated therein.

FIGS. 8-16 illustrate a third embodiment of an outrigger pad holder. FIG. 8 illustrates a front view. FIG. 9 illustrates a perspective view with the outrigger pad holder attached to the cylinder of an outrigger. FIG. 10 the outrigger pad holder without an extension for receiving a U clamp. FIG. 10 illustrates a side view while FIG. 11 illustrates a top view. FIG. 12 illustrates a formed angle extension that may be coupled to the support plate of the outrigger pad holder as shown in FIGS. 10 and 11. FIG. 13 illustrates a front view of an outrigger pad holder as coupled to the cylinder of an outrigger and with an outrigger pad placed therein. FIG. 14 illustrates a perspective view of an outrigger pad holder as coupled to the cylinder of an outrigger and with an outrigger pad placed therein. FIG. 15 illustrates a side view of an outrigger pad holder as coupled to the cylinder of an outrigger and with an outrigger pad placed therein. FIG. 16 illustrates a top view of an outrigger pad holder as coupled to the cylinder of an outrigger and with an outrigger pad placed therein.

The outrigger pad holder 210 comprises a support plate 212. The support plate 212 includes an upper connection point 226 that is laterally offset by fold 228. A receiving pocket 213 is formed by edges 214 and bottom 216, with the support plate 212 forming the back of the pocket 213. The edges 214 may be referred to as left and right flanges and the bottom 216 may be referred to as a lower flange. In the embodiment shown, the edges 214 and bottom 216 are integrally formed with the plate 212, for example by folding extending portions of the plate 212. While separate edges 214 and bottom 216 are shown, in alternative embodiments, a continuous edging may be provided around a portion of the periphery of the pocket 13.

The edges comprise a first side 214a and a second side 214b. Similarly, the bottom comprises a first side 216a and a second side 216b. The relative size of the extensions may be modified to adjust the size of the pocket 213 to accommodate differently sized outrigger pads. Outrigger pads generally have non-planar upper faces such that extending side 214b, a front side, may cause it to connect with a different portion of the upper face of the outrigger pad to give a more snug fit. While in the embodiment shown, the sides 214a and 214b forming edges 214 and sides 216a and 216b forming bottom 216 comprise integral extensions of the support plate, in other embodiments, the edges may each comprise one or more separate pieces that are welded or otherwise attached to the plate.

The support plate 212 includes a plurality of cut outs 217 to reduce the weight of the outrigger pad holder. In the embodiment shown, three vertical cut outs are provided. In other embodiments, such as shown in FIGS. 1a and 1b, one or more horizontal cut outs may be used. In some embodiments, a mix of horizontal and vertical cut outs could be used. In general, it may be desirable for the cut outs to have a size and shape that reduces the likelihood of the outrigger pad catching the cut out when being put into or taken out of the outrigger pad holder.

In the embodiment of FIGS. 8-16, and best seen in FIGS. 14 and 15, the upper connection point 226 is laterally offset from the remainder of the support plate 212 to shape the outrigger pad holder such that it can be placed as close to the outrigger as possible and take the least amount of space. The bend 228 impairs vertical movement of the outrigger pad out of the pocket 213. The front sides 214b of the edges 214 may be chamfered to provide additional clearance to allow the outrigger pad to be removed from the pocket 213 of the outrigger pad holder.

The outrigger pad holder 210 may be attached to the outrigger at 3 points. In some outriggers, multiple pieces of the outrigger are held together using male connectors, such as bolts, extending through female connectors of the outrigger. The connection point 226 of the outrigger pad holder includes tabs 226a and 226b, each having an opening 220 for receiving a bolt. As can be seen in FIG. 9, tabs 226a and 226b are a result of a gusset on the outrigger cylinder. Where no gusset is on the cylinder, a single tab may be used. Alternatively, the relative size of the tabs may be changed to accommodate a differently placed gusset. To install the outrigger pad holder 210, the outrigger male connector of the outrigger may be swapped out with a longer connector and the connection point 226 put between two typically adjacent outrigger parts. Accordingly, two male connectors, such as bolts, are extended through openings 220 and into reciprocal female connectors of the outrigger. In this embodiment, the outrigger pad holder attaches to a faceplate of the outrigger wherein the faceplate is vertical and the bolts are horizontal.

For the third connection point, an extension 218b may be provided supporting a U-bracket 219 that extends around the outrigger. FIG. 12 illustrates a formed angle extension 218b, in accordance with one embodiment. The U-bracket may be extended through openings 228 in the extension 218b. The shape of the extension 218b may vary based on manufacturability and/or use. In the embodiment shown, the extension 218b is L-shaped or a formed angle. The formed angle extension 218b includes tabs 221 for receipt by slots 225 in the support plate 212. A formed angle extension 218b having tabs 21 on both ends thereof may be used interchangeably on a street side or a curb side outrigger pad holder. Alternatively, tabs 221 may be provided only on the end of the formed angle extension 218b that is inserted into the slots 225 of the support plate 212. Using the formed angle extension 218b with tabs and slots, the placement of the extension 218b on the support plate 212 may be precisely controlled.

It is to be appreciated that more or fewer points of connection may be used and the specifics of the connection are less important than the fact that the outrigger pad holder is coupled directly to the outrigger. By coupling the outrigger pad holder to the outrigger itself, the placement of the pad holder follows the position of the outrigger. Thus, for example, when the outrigger is extended, the outrigger pad holder is also extended. The outrigger pad may then be removed from the outrigger pad holder approximately at the location where it is to be used. Conversely, when the outrigger is retracted into the truck, the outrigger pad holder is similarly retracted into the truck. The outrigger cannot be extended from the truck or the outrigger pad removed from the outrigger pad holder unless the truck is being operated.

FIGS. 12-14 illustrate an outrigger pad holder in accordance with the embodiment of FIGS. 9-11, with an outrigger pad holder positioned therein. FIG. 9 illustrates a front view, FIG. 10 illustrates a side view, and FIG. 11 illustrates a top view.

In the embodiments shown, the outrigger pad holder is mounted to the side of the outrigger and, when the outrigger and outrigger pad holder are retracted, is viewable from the side of the truck. In other embodiments, the outrigger pad holder (and outrigger pad) may be otherwise mounted on the outrigger such that the outrigger pad holder (and outrigger pad) are not viewable from the side of the truck when in the retracted position.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. An outrigger pad holder for holding an outrigger pad, the outrigger pad holder comprising:
   a pocket for receiving an outrigger pad, the pocket comprising a support plate and at least one flange; and
   at least one attachment point at which the outrigger pad holder is fixedly attached to an outrigger.

2. The outrigger pad holder of claim 1, wherein the at least one flange comprises a right flange, a left flange, and a lower flange.

3. The outrigger pad holder of claim 2, wherein an upper portion of the right flange and an upper portion of the left flange are chamfered.

4. The outrigger pad holder of claim 2, wherein the support plate, the right flange, the left flange, and the lower flange are integrally formed.

5. The outrigger pad holder of claim 1, further comprising at least one cut out in the support plate.

6. The outrigger pad holder of claim 2, wherein the at least one attachment point comprises an aperture on the support plate, wherein the aperture on the support plate is aligned with an aperture on the outrigger and a bolt is extended through the aperture on the support plate and the aperture on the outrigger.

7. The outrigger pad holder of claim 6, wherein the bolt extends vertically through the aperture on the support plate.

8. The outrigger pad holder of claim 6, wherein the bolt extends horizontally through the aperture on the support plate.

9. The outrigger pad holder of claim 2, further comprising a support flange extending from the support plate.

10. The outrigger pad holder of claim 1, wherein the at least one attachment point comprises an extension for receiving a U-bracket and the U-bracket is configured to extend around an outrigger cylinder.

11. The outrigger pad holder of claim 10, wherein the extension is a C-channel extension.

12. The outrigger pad holder of claim 10, wherein the pocket is formed with a support plate wherein the extension is a formed angle extension and includes tabs for inserting in slots in the support plate.

13. An outrigger pad holder for holding an outrigger pad, the outrigger pad holder comprising:
    a support plate, a right flange, a left flange, and a lower flange, wherein a pocket for receiving the outrigger pad is formed by the support plate, the right flange, the left flange, and the lower flange;
    an extension for receiving a U-bracket such that the U-bracket and extension encircle an outrigger cylinder and provide a first attachment point of the outrigger pad holder to the outrigger; and
    an aperture on the support plate, wherein the aperture on the support plate is aligned with an aperture on the outrigger and a bolt is extended through the aperture on the support plate and the aperture on the outrigger to provide a second attachment point of the outrigger pad holder to the outrigger.

14. The outrigger pad holder of claim 13, wherein the extension is a C-channel extension.

15. The outrigger pad holder of claim 13, wherein the extension is a formed angle extension and includes tabs for inserting in slots in the support plate.

16. The outrigger pad holder of claim 13, wherein the bolt extends vertically through the aperture on the support plate.

17. The outrigger pad holder of claim 16, wherein the aperture on the support plate is provided through a slot extending from an upper connection point of the support plate, wherein the upper connection point of the support plate is laterally offset from a remainder of the support plate.

18. The outrigger pad holder of claim 17, wherein an upper portion of the right flange and an upper portion of the left flange are chamfered.

19. The outrigger pad holder of claim 13, wherein the bolt extends horizontally through the aperture on the support plate.

20. An outrigger pad holder for holding an outrigger pad, the outrigger pad holder comprising:
- a support plate, a right flange, a left flange, and a lower flange, wherein a pocket for receiving the outrigger pad is formed by the support plate, the right flange, the left flange, and the lower flange, and wherein the support plate includes slots;
- a formed angle extension for receiving a U-bracket such that the U-bracket and formed angle extension encircle an outrigger cylinder and provide a first attachment point of the outrigger pad holder to the outrigger, wherein the formed angle extension includes tabs for insertion in the slots of the support plate; and
- an aperture on the support plate, wherein the aperture on the support plate is aligned with an aperture on the outrigger and a bolt is extended through the aperture on the support plate and the aperture on the outrigger to provide a second attachment point of the outrigger pad holder to the outrigger.

* * * * *